US010601461B1

(12) United States Patent
Eaton et al.

(10) Patent No.: US 10,601,461 B1
(45) Date of Patent: Mar. 24, 2020

(54) SYSTEMS AND METHODS FOR INTEGRATED ANTENNAS

(71) Applicant: Ford Global Technologies, LLC, Dearborn, MI (US)

(72) Inventors: Eric Eaton, Lake Worth, FL (US); Gabriel Solana, Miami, FL (US); Mauricio Flores, Boca Raton, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/279,928

(22) Filed: Feb. 19, 2019

(51) Int. Cl.
*H04B 1/74* (2006.01)
*H01Q 1/32* (2006.01)
*H04W 64/00* (2009.01)

(52) U.S. Cl.
CPC ............. *H04B 1/74* (2013.01); *H01Q 1/3208* (2013.01); *H01Q 1/3291* (2013.01); *H04W 64/00* (2013.01)

(58) Field of Classification Search
CPC ...... H04B 1/74; H01Q 1/3208; H01Q 1/3291; H04W 64/00
See application file for complete search history.

(56) References Cited

U.S. PATENT DOCUMENTS

| 8,064,960 | B2 | 11/2011 | Wisnewski et al. | |
| 8,508,419 | B2 | 8/2013 | Petrucci et al. | |
| 8,583,199 | B2 | 11/2013 | Wisnewski et al. | |
| 9,083,414 | B2 | 7/2015 | Basnayake et al. | |
| 2012/0098717 | A1* | 4/2012 | Petrucci | H01Q 1/3275 343/713 |
| 2014/0292593 | A1 | 10/2014 | Thiam et al. | |
| 2016/0087655 | A1* | 3/2016 | Kim | H04W 4/90 455/404.1 |

FOREIGN PATENT DOCUMENTS

CN 206388842 U 8/2017

* cited by examiner

*Primary Examiner* — Nguyen T Vo
(74) *Attorney, Agent, or Firm* — Michael Spenner; Eversheds Sutherland (US) LLP

(57) ABSTRACT

Systems and methods are disclosed for integrated antennas in vehicles and corresponding techniques for use in connection with location determination and wireless communication protocols. Example methods may include determining a condition associated with a vehicle; and determining, based on the condition, to switch from a first antenna associated with wireless communication, or a second antenna associated with location determination, to a backup antenna associated with the vehicle. Moreover, the backup antenna may have a wireless communication capability and a location determination capability.

18 Claims, 9 Drawing Sheets

SYSTEMS AND METHODS FOR INTEGRATED ANTENNAS

TECHNICAL FIELD

The disclosure relates generally to antennas, and in particular, integrated antenna systems.

BACKGROUND

Various control units, software interfaces, and corresponding hardware devices may serve to provide wireless connectivity for a vehicle, for example, using various vehicle-based antennas. However, the control units, other hardware, and software modules may not necessarily be able to provide reliable wireless coverage using conventional systems. In some cases, such a conventional system may have various design shortcomings that may lead to reduced data throughput, increased antenna system footprint, increased antenna cost, or the like.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
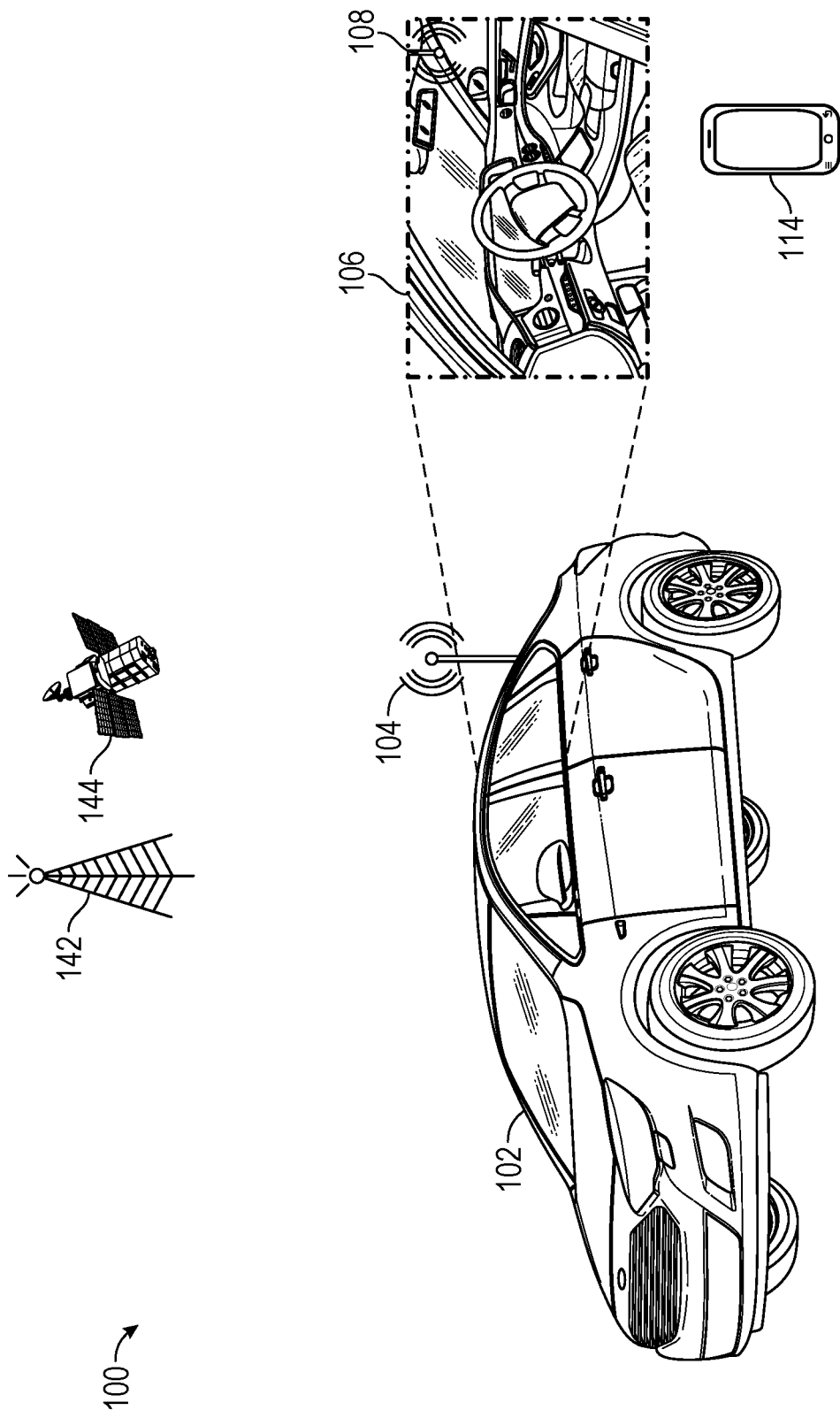
FIG. 1 is an illustration of an exemplary environmental context demonstrating the use of an integrated antenna system, in accordance with example embodiments of the disclosure.

Throughout the drawings, identical reference characters and/or descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In various aspects, vehicles may include various embedded systems to perform a variety of functions. For example, a vehicle may use telematics devices (e.g., telematics computing units (TCUs)), to control the tracking of the vehicle. For example, the vehicles may use a first telematics device for general purpose communication protocols. The communication protocols may include, but are not limited to, Code Division Multiple Access (CDMA), Time Division Multiple Access (TDMA), third generation (3G), fourth generation (4G), fifth generation (5G), Long-Term Evolution (LTE) and/or other switched wireless technologies, global positioning system (GPS), Wi-Fi, and/or the like. The vehicles may also a second telematics device for vehicle theft detection and/or tracking. In an aspect, using separate TCUs may lead to increased vehicle cabin volume usage and may increase associated costs.

Embodiments of the disclosure are directed to integrated antenna systems and corresponding techniques for use in connection with location determination and wireless communications in vehicles. In various embodiments, the disclosure described an antenna system configured to provide communication links for both high data rate cellular (e.g., CDMA, TDMA, 3G, 4G, 5G, LTE and/or other switched wireless technologies) paths and low data rate location determination (e.g., global navigation satellite system (GNSS)) paths. For example, a first antenna may be employed to provide cellular access to a machine, vehicle, or another device and a second antenna may be employed to receive GPS data to facilitate determination of a location of the machine, the vehicle, or another device. Moreover, the antenna system may be selectively switchable to a backup path (e.g., via a backup antenna). In some embodiments, the switchable backup path may include a cellular path (e.g., a path based on CDMA, TDMA, 3G, 4G, 5G, LTE and/or other switched wireless technologies path), a location determination path (e.g., a GNSS path), or both. That is, the backup antenna may be capable of transmitting cellular frames and capable of receiving GNSS frames using the respective path. In another embodiment, the disclosed systems may use a switching network to switch the antenna system based on diagnostic results indicating the condition of the antennas in the antenna system. Further, the disclosed systems may switch the antenna system based on numerous factors, including, a time required to complete a portion of a transmission, a data reporting requirement, one or more power conditions, combinations thereof, and/or the like, to be described further below.

Moreover, the disclosed antenna system may provide communications using various protocols, thus enabling a plurality of services for the vehicle and/or associated entities (e.g., owners, companies, police, and/or the like). Further, various services and associated communications may impose different performance requirements on the antenna system. Accordingly, at least two antennas may be configured to perform at a predetermined efficiency and within an available spatial footprint, in order to support data throughput and signal sensitivities at or exceeding predetermined thresholds. For example, a first antenna may be a cellular (e.g., CDMA, TDMA, 3G, 4G, 5G, LTE and/or other switched wireless technologies) antenna and a second antenna may be a location-determination (e.g., GNSS-based) antenna. That is, the antenna system may be designed to conform to the requirements of both location determination and wireless communications protocols. In particular, the antenna system may be compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, the Federal Communications Commission (FCC), the 3rd Generation Partnership Project (3GPP), and 3GPP Project 2, (3GPP2) and Open Mobile Alliance (OMA). However, devices based on other standards could also be used. For ease of description of the embodiments of the disclosure, LTE is used as an example of cellular protocol and GNSS is used as an example of location determination protocol. However, if should be understood that examples based on other standards could also be used.

In some examples, the antenna system and corresponding techniques may be configured to support one or more real-time interactive features, including, but not limited to, navigation and content streaming. In an embodiment, for such implementations, the disclosed systems may use a direct-feed and/or a relatively larger antenna system with a corresponding lower loss level. In other cases, such a high data rate throughput may not be needed. For example, the disclosed systems may track a stolen vehicle using only a relatively low-bandwidth data connection (e.g., a low-bandwidth data connection for transmitting location, speed, direction and other vehicle status conditions). In another embodiment, the antenna system may deliver such information to the vehicle at a relatively lower data rate in comparison to content streaming applications. Further, the antenna system may not require a continuous connection to a wireless or cellular network for the delivery of such low-bandwidth information. Accordingly, the disclosed antenna system may be configured to handle a variety of data transmissions having different latency, throughput, and/or bandwidth characteristics.

In various aspects, embodiments of the disclosure may be directed to an antenna system that enables high throughput data transmissions and/or redundant, low throughput data transmissions, in order to optimize communications for vehicles in a variety of conditions, to be described further below. Further, there may be tradeoffs (e.g., size vs. bandwidth and cost) in the design of the antennas of the antenna system and an associated antenna-switching network configured to switch between different antennas of the antenna system. In another embodiment, the disclosed antenna systems may be relatively cost-effective as compared with conventional antenna systems.

In another embodiment, when both cellular (e.g., LTE) and location determination (e.g., GNSS) signals are present in the environment of an antenna system having both cellular and location determination antennas, the location determination signal may have a relatively weak link margin in comparison with the cellular signal. Moreover, the transmission power for various cells of a cellular (e.g., LTE) network may support higher-order modulation transmissions, for example, to support higher data rates. Accordingly, due at least to the lower transmission throughput requirements of the antenna system's cellular antenna, the backup antenna system can be designed to allow for a less efficient cellular performance while the antenna system still achieves maximum location determination signal sensitivity, thereby reducing the size and/or cost of the antenna system while not compromising the antenna system's functionality.

In some embodiments, the design of the backup antenna and associated systems may be based on various system requirements. In another embodiment, the design of the backup antenna and associated systems may be optimized both for system cost and size for use in connection with TCUs having different network coverage requirements (e.g., GNSS and LTE coverage requirements). Further, various telematics applications may operate at relatively low data throughput rates (e.g., stolen vehicle services that transmit location and other status information). Accordingly, various parameters (e.g., transmission location, modulation type, transmit power, dynamic power management, and/or the like) may be different between antennas of the antenna system that are used for different networks. In another embodiment, there may be a several decibel (dB) difference in the signal requirements for high-speed throughput modulation (e.g., 64 quadrature amplitude modulation, QAM) and low-speed modulation (quadrature phase-shift keying, QPSK) in some networks (e.g., in LTE networks). Accordingly, embodiments of the disclosure may include antennas that may tradeoff a bandwidth performance (e.g., bandwidth performance for LTE connectivity) for an overall antenna size.

Moreover, embodiments of the disclosure describe antenna systems that may have a lower system cost as compared with conventional antenna systems, at least because the disclosed antenna systems may be configured to use a single cable and a single antenna. In another embodiment, the disclosed antenna systems may have a relatively smaller size as compared with conventional antenna systems at least because the disclosed antenna systems may include antennas and circuits designed to balance the various communication protocol (e.g., LTE and GNSS) link margins for a given application.

FIG. 1 is an illustration of an exemplary environmental context demonstrating the use of an integrated antenna system, in accordance with example embodiments of the disclosure. In particular, FIG. 1 shows diagram 100 illustrating an environmental context for using the antenna system in conjunction with a vehicle. Moreover, diagram 100 shows vehicle 102, external antenna(s) 104, vehicle interior 106, internal antenna(s) 108, vehicle-based devices 114, one or more satellites 142, and one or more cellular towers 144, as further described below.

In one embodiment, diagram 100 shows vehicle 102. In various embodiments, the vehicle 102 may be associated with one or more users (e.g., a driver and one or more passengers). In one embodiment, the vehicle 102 may include vehicle-based devices 114, for example, user devices (e.g., mobile devices, tablets, laptops, and the like). In one embodiment, the vehicle 102 may be any suitable vehicle such as a motorcycle, a car, a truck, a recreational vehicle (RV), a boat, plane, and/or the like, and may be equipped with suitable hardware and software that enables it to communicate over a network, such as a local area network (LAN) or a wide area network (WAN).

In one embodiment, the vehicle 102 may include an autonomous vehicle (AV), as further described in connection with FIGS. 8-9, below. In another embodiment, the vehicle 102 may include a variety of sensors that may aid the vehicle in navigation, such as radio detection and ranging (RADAR), light detection and ranging (LIDAR), cameras, magnetometers, ultrasound, barometers, and/or the like. In one embodiment, the sensors and other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards and/or the like).

Diagram 100 further shows external antenna(s) 104 which may be coupled to the exterior (e.g., the frame) of the vehicle 102. In some aspects, the external antenna(s) 104 is discussed further in connection with elements 204, 206, 208, and 212 of FIG. 2, below. In various embodiments, the external antenna(s) 104 may include any suitable type of antenna corresponding to the communications protocols used by the user device and the devices of the vehicle. Some non-limiting examples of suitable external antenna(s) 104 include cellular (e.g., LTE) antennas, location-determination antennas (e.g., GPS and/or Global Navigation Satellite System (GNSS) antennas), in addition to IEEE 802.11 family of standards compatible (e.g., Wi-Fi) antennas, or other standards mentioned above (e.g., ITU, ETSI, IETF, NIST, ANSI, WAP, DOCSIS, Bluetooth, FCC, 3GPP, 3GPP2, and OMA). Further, the antennas may include directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from external entities and/or vehicle-based devices 114, and/or the like.

Diagram 100 further shows vehicle interior 106, which may have suitable proportions, shape, placement, and surfaces for internal antenna(s) 108, vehicle devices, instrument panels, seats, door trim panels, headliner, pillar trims, and/or the like.

Diagram 100 shows internal antenna(s) 108. In particular, internal antenna(s) 108 may be similar, but not necessarily identical to, external antenna(s) 104, except that they may be in the vehicle interior 106. In some aspects, the internal antenna(s) 108 is discussed further in connection with backup antenna 212 of FIG. 2, below. It should be understood that the internal antenna(s) 108 may be located in various locations in the vehicle interior 106 based on the desired application.

Diagram 100 shows vehicle-based devices 114. In particular, the vehicle-based devices 114 may include user device (e.g., a mobile phone, tablets, laptops, and/or the like) and/or vehicle devices such as navigation systems, radios, entertainment systems, and/or the like. Further, a user device may be configured to communicate with the one or more devices of the vehicle 102 using one or more communications networks, wirelessly or wired. Further, the vehicle 102 and/or any devices of the vehicle 102 may be configured to communicate using one or more communications networks, wirelessly or wired. Any of the communications networks may include, but are not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), WANs, LANs, or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In another embodiment, the vehicle-based devices 114 may include any suitable radio and/or transceiver for transmitting and/or receiving radio frequency (RF) signals in the bandwidth and/or channels corresponding to the communications protocols utilized by any of the devices to communicate with each other. The radio components may include hardware and/or software to modulate and/or demodulate communications signals according to pre-established transmission protocols. The radio components may further have hardware and/or software instructions to communicate via one or more cellular (e.g., LTE) protocols, location-determination protocols (e.g., GPS and/or GNSS protocols), or other protocols mentioned above (e.g., ITU, ETSI, IETF, NIST, ANSI, WAP, DOCSIS, Bluetooth, FCC, 3GPP, 3GPP2, and OMA). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In another aspect, the environmental context shown in diagram 100 may include one or more satellites 142 and one or more cellular towers 144. In another embodiment, the vehicle 102 may include a transceiver, which may, in turn, include one or more location receivers (e.g., GNSS antennas and/or receivers). For example, the transceiver may include GPS receivers that may receive location signals (e.g., GPS signals) from one or more satellites 142. In another embodiment, a GPS receiver may refer to a device that can receive information from GPS satellites (e.g., satellites 142) and calculate the vehicle's 110 geographical position. Using suitable software, the vehicle may display the position on a map displayed on a human-machine interface (HMI), and the GPS receiver may offer information corresponding to navigational directions.

In one embodiment, GPS navigation services may be implemented based on the geographic position information of the vehicle provided by a GPS-based chipset/component. A user of the vehicle 102 may enter a destination using inputs to an HMI including a display screen, and a route to a destination may be calculated based on the destination address and a current position of the vehicle determined at approximately the time of the route calculation.

In another embodiment, vehicle-based devices 114 (e.g., a user device or a navigation system) may use GPS signals received from a GNSS. In another embodiment, a user device (e.g., a smartphone) may also have GPS capability that may be used in conjunction with the GPS receiver, for example, to increase the accuracy of calculating the vehicle's 102 geographical position. In particular, the user's device may use assisted GPS (A-GPS) technology, which can use base station or cellular towers 144 to provide a faster time to first fix (TTFF), for example, when GPS signals are poor or unavailable. In another embodiment, the GPS receiver may be connected to other vehicle-based devices 114 associated with the vehicle 102. Depending on the type of electronic devices and available connectors, connections can be made through a serial or universal service bus (USB) cable, as well as a Bluetooth connection, a compact flash connection, a standard (SD) connection, a personal computer memory card international association (PCMCIA) connection, an ExpressCard connection, and the like.

In various embodiments, the GPS receiver may be configured to use an L5 frequency band (e.g., centered at approximately 1176.45 MHz) to determine a higher accuracy location (e.g., to pinpoint the vehicle 102 to approximately one foot accuracy). In another embodiment, the location device may include the capability to detect location signals from one or more non-GPS-based systems, for example, to increase the location accuracy. For example, the location device may be configured to receive one or more location signals from a Russian global navigation satellite system (GLONASS), a Chinese BeiDou navigation satellite system, a European Union Galileo positioning system, an Indian regional navigation satellite system (IRNSS), and/or a Japanese quasi-zenith satellite system, and the like.

Figure 2:
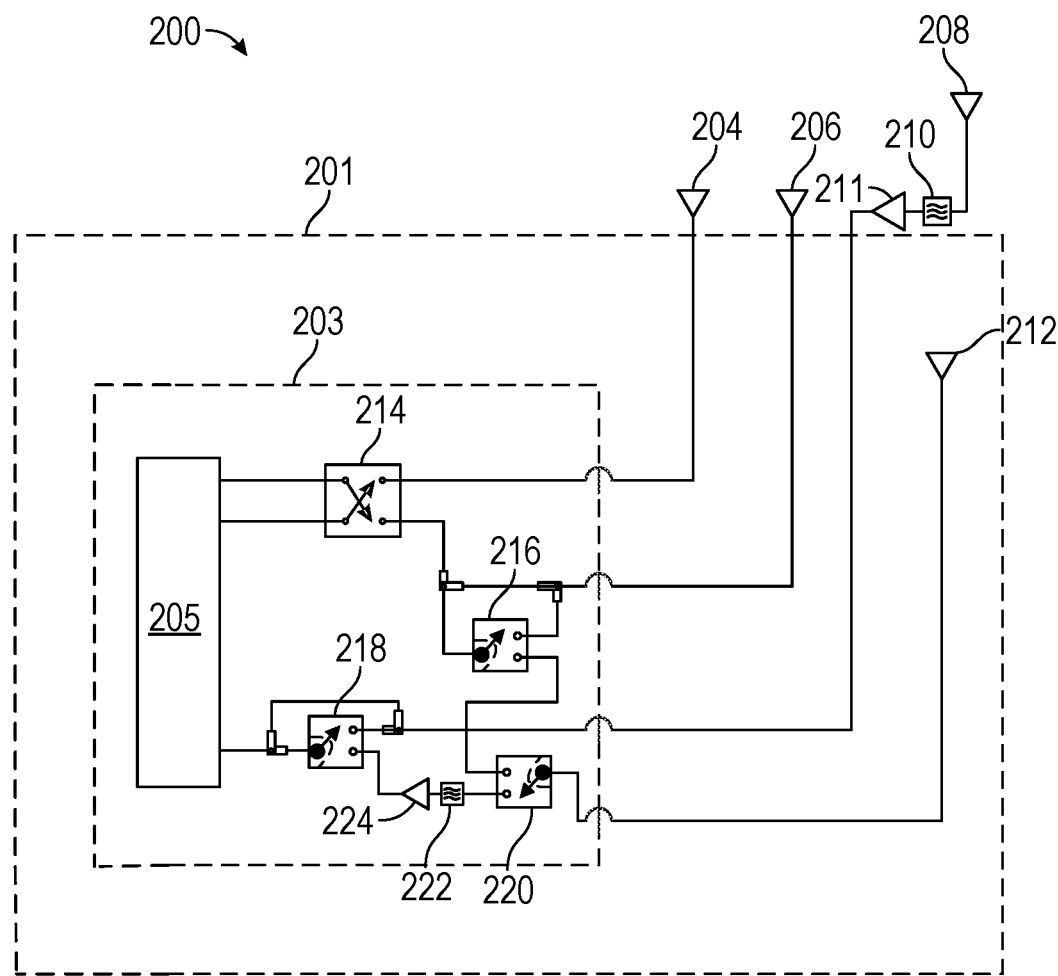
FIG. 2 is an illustration of an exemplary circuit schematic, in accordance with example embodiments of the disclosure.

FIG. 2 is an illustration of an exemplary circuit schematic, in accordance with example embodiments of the disclosure. In particular, FIG. 2 shows a switch diagram of one or more antennas associated with a vehicle (e.g., a vehicle 102 shown and described in connection with FIG. 1, above). In FIG. 2 there is shown a vehicle enclosure 201, an embedded system enclosure 203, a network access device (NAD) 205, a main antenna 204, a diversity antenna 206, a location antenna 208, a filter 210, an amplifier 211, a backup antenna 212, a cross-over switch 214, a first switch 216, a second switch 218, a third switch 220, a filter 222, and an amplifier 224, to be described herein.

The example switch diagram shown in FIG. 2 illustrates aspects of the antenna system that may be used in connection with a vehicle (e.g., a vehicle 102 shown and described in connection with FIG. 1, above). In particular, the antenna system depicted in diagram 200 may include a cross-over switch 214 which may serve to switch a main antenna 204 and a diversity antenna 206, enabling either path to transmit cellular data from the vehicle. In addition, there may be a switching network including a cross-over switch 214, a first switch 216, a second switch 218, a third switch 220. The switching network may allow a backup antenna 212 having cellular communications capabilities to serve as the main cellular antenna of the vehicle if a situation arises that would trigger the switch (e.g., a situation where both the main antenna 204 and the diversity antennas 206 are disabled). The switching network may switch between the various antennas of the antenna system based on a vehicle's condition, as described further herein.

In some embodiments the vehicle enclosure 201 shown in diagram 200 may comprise various devices. For example, the vehicle enclosure 20 may comprise, a least in part, the NAD 205, the internal antenna 212, and the switching network. In one embodiment, the vehicle enclosure 201 may include vehicle chassis such as a vehicle frame including, but not limited to, the underpart of a motor vehicle, on which the body is mounted. As used herein, the vehicle frame may refer to the main supporting structure of a motor vehicle, to which all other components are attached. In particular, the vehicle enclosure 201 may separate the exterior of the vehicle from the interior of the vehicle.

In some embodiments the embedded system enclosure 203 shown in diagram 200 may include any suitable embedded system, for example, a telematics control unit (TCU). In particular, the TCU may refer to an embedded system on board of a vehicle that controls tracking of the vehicle. In various embodiments, the embedded system enclosure 203 may include an enclosure that protects the TCU or similar device from its environment (e.g., from electromagnetic interference (EMI), pollution, liquids, aerosols, and/or the like).

In some embodiments the NAD 205 shown in diagram 200 may use the antennas to communicate with a wireless network. NAD may refer to an electronic device used to make a connection to a network (e.g., a wide area network (WAN) and/or a local area network (LAN)). The NAD may include a router, modem and a monitored power supply.

In some embodiments the main antenna 204 shown in diagram 200 may be configured to operate on a cellular (e.g., an LTE) network. In some embodiments, the main antenna 204 may be configured to operate with diversity antenna 206 to increase the performance of the main antenna 204. In various embodiments, the main antenna 204 may include any suitable type of antenna corresponding to the communications protocols used by the user device and the devices of the vehicle. Some non-limiting examples of suitable external antenna(s) 104 include cellular (e.g., LTE) antennas, location-determination antennas (e.g., GPS and/or GNSS antennas). Further, the external antenna(s) 104 may include IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals.

In some embodiments the diversity antenna 206 shown in diagram 200 may be similar, but not necessarily identical to, the main antenna 204. In another embodiment, the diversity antenna 206 may serve to provide space diversity or spatial diversity to increase the signal strength from the main antenna 204. In particular, in urban and indoor environments, there may not be a clear line-of-sight (LOS) between a transmitter (e.g., a satellite) and receiver (e.g., the main antenna 204). Instead, the signal is reflected along multiple paths before finally being received. Accordingly, a diversity antenna 206 may be used to improve the quality and reliability of a wireless link.

In various embodiments, the location antenna 208 shown in diagram 200 may be similar, but not necessarily identical to, main antenna 204. In another embodiment, the location antenna 208 may be configured to receive location signals, for example, from the GNSS, in order to determine the location of a vehicle.

In various embodiments, the filter 210 shown in diagram 200 may serve to condition the detected signal from the location antenna 208 prior to processing (e.g., by the NAD 205 in association with one or more processors). In particular, the filter 210 may be passive or active, analog or digital, high-pass, low-pass, band-pass, and/or band-stop (including band-rejection and/or notch filters). In another embodiment, the filter 210 may include a discrete-time (sampled) or continuous-time filter. Further, the filter 210 may be linear or non-linear.

In some embodiments, various passive components may be used in association with the filter 210. In one embodiment, the filter 210 may include passive filters, such as linear filters (e.g., RLC-based filters). In another embodiment, linear filters may include combinations of resistors (R), inductors (L) and capacitors (C). As noted, such filters are collectively known as passive filters, at least because they may not depend upon an external power supply and/or they may not contain active components (e.g., transistors, amplifiers, etc.).

In one embodiment, the filter 210 may include an inductor that may serve to block high-frequency signals and may serve to conduct low-frequency signals. In another embodiment, the filter 210 may include a capacitor in a that may serve do the reverse. In various embodiments, a filter in which the signal passes through an inductor, or in which a capacitor provides a path to ground, may presents less attenuation to low-frequency signals than high-frequency signals and may therefore serve as a low-pass filter. In another embodiment, if the signal passes through a capacitor, or has a path to ground through an inductor, then the filter may present less attenuation to high-frequency signals than low-frequency signals and therefore may serve as a high-pass filter. In one embodiment, resistors may not having frequency-selective properties, but may be added to inductors and capacitors (e.g., in a RLC network) in order to tune time-constants of the circuit, and therefore the frequencies to which the circuits respond (e.g., to tune the passband of a filter, for example, to filter out noise). In various embodiments, the filter may include a single element type filter, a double element type filter, or the three-element type filter. For example, the filter may include a low-pass electronic filter realized by an RC circuit. Moreover, additional passive filters such as RC and RL filters, and/or LC filters to perform any suitable filtering step.

In some embodiments, the amplifier 211 shown in diagram 200 may include any suitable amplifier that may serve to amplify a signal (e.g., a GPS signal from the location antenna 208). In particular, amplifier 211 may include a low-noise amplifier (LNA). In particular, the LNA may include various parameters that may be selected or determined to meet the application of amplifying signals. In particular, the LNA may be configured to exhibit a noise figure below a threshold. In another embodiment, the LNA may be configured to have a current usage below a given threshold. In another embodiment, the LNA may have a be configured to have an input and/or output port that is relatively well matched (e.g., as characterized, for example, by a voltage standing wave ratio (VSWR) of a predetermined value). In various embodiments, the LNA may be configured to have a common-source amplifier topology, a common-gate amplifier topology, and/or a cascode amplifier topology, or any other suitable topology.

In various embodiments, the backup antenna 212 shown in diagram 200 may include an antenna that supports both data transmission and reception using cellular (e.g., LTE) services as well as location determination (e.g., GNSS) services. Further, in some embodiments, having a backup antenna 212 having a single antenna capable of performing both cellular and location determination communications may serve to reduce the wiring complexity and material costs of the implementation. As noted, a switching network (e.g., a cross-over switch 214, a first switch 216, a second switch 218, a third switch 220) may be used to switch between cellular (e.g., LTE) services and the location determination (e.g., GNSS) services, as needed.

In an example embodiment, the disclosed systems may determine the state of the switching network based on a vehicle (e.g., vehicle 102) condition. In particular, the switching network may detect if the main cellular or location determination antennas are not functioning properly (e.g., the vehicle has been stolen) and may switch to the backup antenna 212 as needed. In another embodiment, if one of the main antenna 204 or the diversity antenna 206 is damaged, the switch may stay locked to the cellular path of the main antenna 204. In one embodiment, if the location antenna 208 is damaged, the switch may switch to the backup antenna 212 path. If both main antenna 204 and diversity antenna 206 are both damaged, the switching network may time multiplex between the cellular path and the backup antenna path.

The cross-over switch 214 shown in diagram 200 that is part of the switching network and may serve to switch between the various antennas of the antenna system. In particular, the cross-over switch 214 may represent a type of electronic switch, which may refer to an electronic component or device that can switch an electrical circuit, interrupting the current or diverting it from one conductor to another. In some embodiments, a switch may include one or more sets of contacts, which may operate simultaneously, sequentially, or alternately. Further, the cross-over switch 214 may serve to switch the operation of the antennas (one or more of the main antenna 204, diversity antenna 206, location antenna 208, backup antenna 212) based on various environmental factors to optimize system performance, as described herein.

As noted, switches may include one or more sets of electrical contacts, which may be connected to external circuits. Moreover, the set of contacts can be in one of two states. For example, in a closed state, the contacts may not be touching and electricity can flow between them; in an open state, the contacts are separated and the switch may be nonconducting. In one embodiment, the cross-over switch 214 may include a double-pole double-throw switch. As used herein, the terms pole and throw may also describe switch contact variations. The number of poles may refer to the number of electrically separate switches which are controlled by a single physical actuator. For example, a 2-pole (or double-pole) switch has two separate, parallel sets of contacts that open and close in unison via the same mechanism. The number of throws may refer to the number of separate wiring path choices other than open that the switch can adopt for each pole. For example, a single-throw switch has one pair of contacts that can either be closed or open. A double-throw switch has a contact that can be connected to either of two other contacts, a triple-throw has a contact which can be connected to one of three other contacts, etc.

In some embodiments the first switch 216, second switch 218, and a third switch 220, that are also part of the switching network shown in diagram 200 may serve to switch between the various antennas of the antenna system. In particular, the switch network may include switches that are a single pole changeover or single pole, triple throw switches. Diagram 200 further shows a filter 222. In some embodiments, filter 222 may be similar, but not necessarily identical to, filter 210, described above. Diagram 200 further shows an amplifier 224. In one embodiment, amplifier 224 may be similar, but not necessarily identical to, amplifier 211, described above.

In various embodiments, the disclosed systems may implement (e.g., using memory and at least one processor) a switching technique that may be used in conjunction with the schematic of diagram 200, including the switching network of the antenna system, to switch between the various antennas (e.g., main antenna 204 and/or diversity antenna 206, location antenna 208, and/or backup antenna 212) of the antenna system. The switching algorithm may be based on a variety of factors. For example, the switching algorithm may be based on a variable timeframe needed to obtain the required information for a given application. In particular, the disclosed systems may switch, using the switching network, the antenna system's antennas to a location determination antenna (e.g., enable a GNSS receiver to determine the vehicle's location), and it may take a predetermined amount of time (e.g., several seconds to a few minutes) to receive data transmissions. In another example, the switching network may switch to a cellular (e.g., LTE) antenna and the switching network may remain engaged with the cellular antenna until the stolen vehicle information is delivered, for example, to a third-party server.

In various embodiments, the switching technique may be based on the state of the vehicle. For example, if police are actively tracking the vehicle, location information determined by one or more antennas of the antenna system may be delivered at a higher rate than if the vehicle is in a different state, for example, an active monitoring mode. In another embodiment, the switching technique may be based on the power source for a TCU associated with the vehicle and/or antenna system. For example, if the TCU is operating from a main battery power supply, various antenna system services and/or updates may be performed more frequently. In another embodiment, if the TCU is operating from a backup power supply (e.g., a backup battery), then the frequency and/or the duration of the communication of the antenna system may be reduced as the power supply is reduced over time. In various embodiments, the switching technique and/or associated switching timing may also be modified based on the reception, by the antenna system or other vehicle devices, of incoming messages (e.g., voice and/or text messages).

In various embodiments, the disclosed systems may use the switching technique to determine switching order to optimize system performance. For example, to achieve relatively faster GNSS lock times, a switching network may need the vehicle to be in a GNSS reception location with relatively good signal strength before the GNSS antenna is enabled. Otherwise, the antenna system may be unable to find a signal within a predetermined duration, and the antenna system may widen its search bandwidth, which may result in poorer signal-to-noise ratio (SNR) performance and may increase the duration required for obtaining a GNSS lock. In another embodiment, the disclosed systems may use a cellular (e.g., LTE) assist mechanism and may operate the network switch using the cellular assist mechanism such that a GNSS location may be gathered in a relatively short period of time (e.g., a few seconds). In one embodiment, once the TCU determines the location of the vehicle, the TCU may be able to switch back to the cellular antenna position and transmit the location data. If the location acquisition is fast enough, the cellular antenna and associated subsystems of the antenna system may not be aware of the operations of the switching network. For example, the operations of the switching network may resemble a tunnel or fade to the cellular antenna and associated subsystems. Accordingly, the antenna system may not need to resynchronize with the cellular network, thereby enabling a quick response-time back to the cellular network without the generation of additional traffic.

As noted, embodiments of devices and systems (and their various components) described herein can employ artificial intelligence (AI) to facilitate automating one or more features described herein (e.g., determining a condition of a vehicle, switching the antenna system, and/or the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc., from a set of observations as captured via events and/or data. Determinations can be employed to identify a specific context or action or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determine an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, neural networks, fuzzy logic models, and/or probabilistic classification models providing different patterns of independence that can be employed. Classification as used herein also is inclusive of statistical regression that is utilized to develop models of priority.

Figure 3:
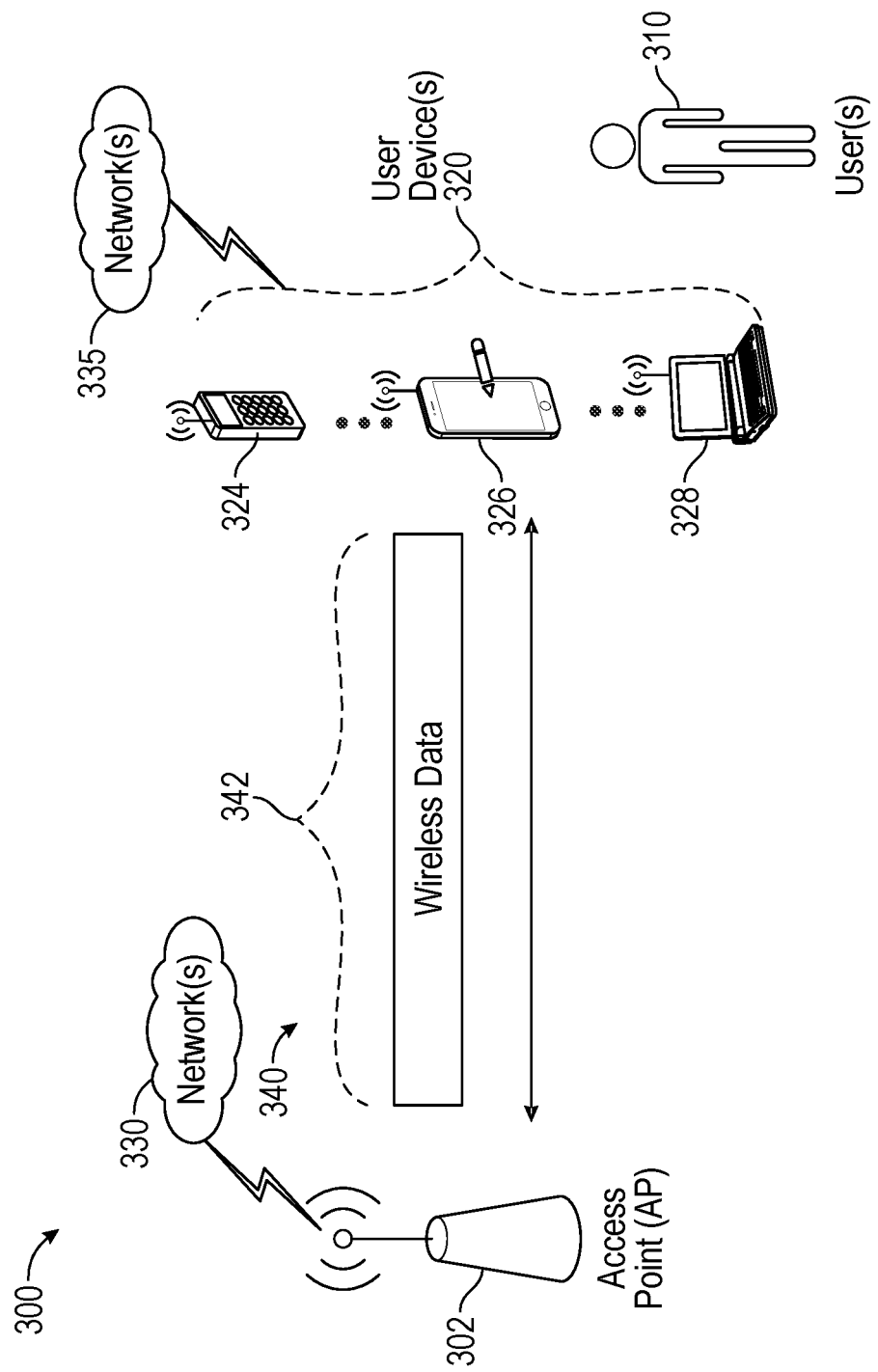
FIG. 3 is a network diagram illustrating an example network environment, according to some example embodiments of the present disclosure.

FIG. 3 is a network diagram illustrating an example network environment, according to some example embodiments of the present disclosure. Wireless network 300 may include one or more devices 320 (e.g., similar, but not necessarily identical to, vehicle-based devices 114, shown and described in connection with FIG. 1, above) and one or more access point(s) (AP) 302 (e.g., including external and/or internal antennas similar, but not necessarily identical to, external antenna 104 and internal antenna 108, shown and described in connection with FIG. 1, above and/or main antenna 204, diversity antenna 206, location antenna 208, and/or backup antenna 212, shown and described in connection with FIG. 2, above), which may communicate in accordance with cellular (e.g., LTE) protocols, location-determination protocols (e.g., GPS and/or GNSS protocols),—or other standards mentioned above (e.g., ITU, ETSI, IETF, NIST, ANSI, WAP, DOCSIS, Bluetooth, FCC, 3GPP, 3GPP2, and OMA). The device(s) 320 may be mobile devices that are non-stationary and do not have fixed locations. In various embodiments, FIG. 3 illustrates example networks, protocols, and data frames associated with network communication enabled by the antenna system and associated devices described herein.

The user device(s) 320 (e.g., 324, 326, or 328) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 320 and AP 302 may include one or more computer systems similar to that of the functional diagram of FIG. 6 and/or the example machine/system of FIG. 7, to be discussed further.

Returning to FIG. 3, any of the user device(s) 320 (e.g., user devices 324, 326, 328), and AP 302 may be configured to communicate with each other via one or more communications networks 330 and/or 335 wirelessly or wired. Any of the communications networks 330 and/or 335 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 330 and/or 335 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 330 and/or 335 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

As previously noted, any of the user device(s) 320 (e.g., user devices 324, 326, 328), and AP 302 may include one or more communications antennae. Communications antenna may be any suitable type of antenna corresponding to the communications protocols used by the user device(s) 320 (e.g., user devices 324, 324 and 328), and AP 302. The communications antenna may be communicatively coupled to a radio component to transmit and/or receive signals, such as communications signals to and/or from the user devices 320.

As previously noted, any of the user devices 320 (e.g., user devices 324, 326, 328), and AP 302 may include any suitable radio and/or transceiver for transmitting and/or receiving radio frequency (RF) signals in the bandwidth and/or channels corresponding to the communications protocols utilized by any of the user device(s) 320 and AP 302 to communicate with each other.

Typically, when an AP (e.g., AP 302) establishes communication with one or more user devices 320 (e.g., user devices 324, 326, and/or 328), the AP may communicate in the downlink direction by sending data frames (e.g., 342). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

Figure 4:
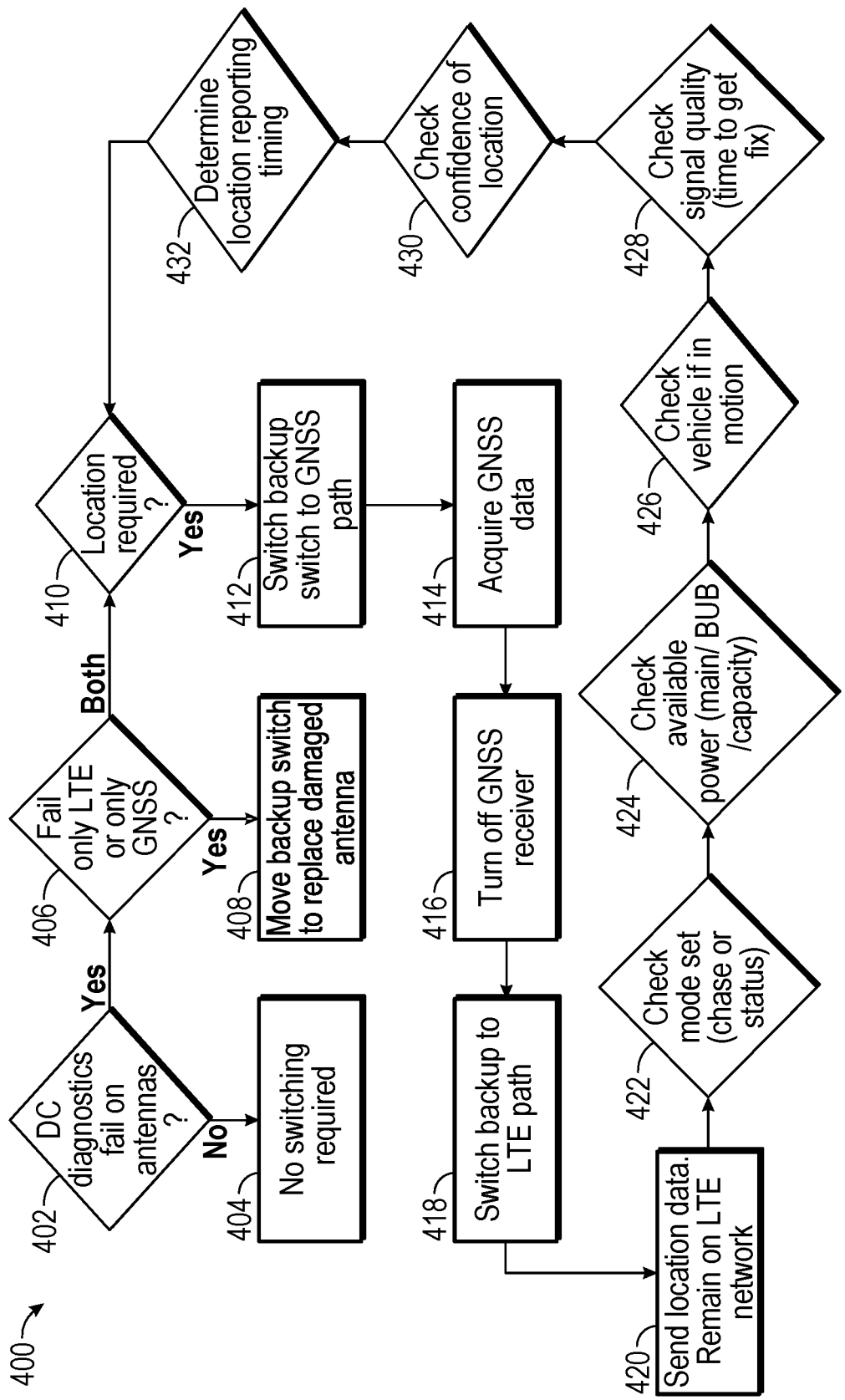
FIG. 4 is an illustration of an exemplary method for using the antenna system, in accordance with example embodiments of the disclosure.

FIG. 4 is an illustration of an exemplary method for using the antenna system, in accordance with example embodiments of the disclosure. In particular, the disclosed systems may perform any of the operations shown in diagram 400 in order to implement aspects of the functionality of the antenna system and associated network switching devices, such as switching between a cellular and location determination antenna and a backup antenna.

At block 402, the method may include determining whether direct current (DC) diagnostics fail on the cellular and location determination antennas (e.g., similar to main antenna 204, diversity antenna 206, and location antenna 208 shown and described in connection with FIG. 2, above). If the result of the determination at block 402 is that the diagnostic tests do not fail, then at block 404, the method may include determining that no switching between the cellular and/or location determination antennas and the backup antenna is needed.

If, on the other hand, the result of the determination at block 402 is that the diagnostic tests do fail, then at block 406, the method may include determining whether the failure was due to only the cellular antenna or due only to the location determination antenna. If the result of the determination at block 406 is that the failure was due to only the cellular antenna or only to the location determination antenna, then at block 408, the method may include switching, using the switching network (e.g., similar to the switching network including a cross-over switch 214, a first switch 216, a second switch 218, a third switch 220, as shown and described in connection with FIG. 2, above) to the backup antenna (e.g., similar to the backup antenna 212 shown and described in connection with FIG. 2, above) in order to replace the unresponsive (e.g., damaged) antenna.

If the result of the determination at block 406 is that the failure was due to both the cellular antenna and the location determination antenna, then at block 410, the method may include determining whether a location of the vehicle is required. For example, the location of the vehicle may be needed based on numerous factors, including, but not limited to, a user input, a vehicle-based device request, an external entity request, and/or the like. If the result of the determination at block 410 is that location is needed, then at block 412, the method may include switching using the network switch, a backup switch to a location determination (e.g., GNSS) path. Accordingly, the backup antenna may be used instead of the failed cellular antenna and location determination antennas of the vehicle.

At block 414, the method may include acquiring a location (e.g., GNSS) data. In another embodiment, the location data may be determined using the backup antenna's GNSS receiver. After receiving the location data, at block 416, the method may include turning off the GNSS receiver of the backup antenna.

At block 418, the method may include determining to switch (e.g., using the switching network of the antenna system), the backup antenna to a cellular (e.g., LTE) path. In another embodiment, the backup antenna may use the cellular path to communicate on a cellular network.

At block 420, the method may include sending location data by the backup antenna via the cellular path. Moreover, the backup antenna may be configured to remain on the cellular network after sending the location data.

At block 422, the method may include determining a mode state of the vehicle. In some embodiments, the mode state may refer to certain states of the vehicle (e.g., stolen and/or lost). In particular, the mode states of the vehicle may determine the rate of a location update status message being sent by the vehicle. For example, if the vehicle is lost or stolen, the police may be actively tracking a moving vehicle in a stolen vehicle mode. Such a mode state may cause more frequent updates to be sent by the vehicle. In comparison, when the vehicle is not in such a state, the vehicle may send updates on its location on a slower and more regular basis.

At block 424, the method may include determining the available power of the vehicle and/or any subsystems of the vehicle. For example, the disclosed systems may determine the available power from the main power supply, a backup power supply. Further, the disclosed systems may determine the vehicle is running with significant amount power available. Examples of power supplies may include, a fuel-based power supply, an electric power supply (e.g., a battery), and/or the like.

At block 426, the method may include determining whether the vehicle is in motion. In particular, the disclosed systems may use various subsystems of the vehicle (e.g., inertial sensors and the like) to determine if the vehicle is in motion. In another embodiment, if it is determined that the vehicle is in motion, the disclosed systems may obtain more frequent updates of the vehicle's location via the antenna system.

At block 428, the method may include determining a signal quality associated with the cellular communications. For example, the determination of signal quality may include a time to obtain a fix of a vehicle. In some embodiments, a fix may refer to a position derived from measurements in relation to external reference points. In another embodiment, the disclosed systems may take additional power and time to send an update over a poor cellular connection.

At block 430, the method may include determining a confidence of the location obtained using the antenna system. In particular, the confidence may be determined as a distance (e.g., a in units of meters) within which the location has a predetermined likelihood (e.g., 90%) of being accurate. Moreover, the confidence may drop if a network signal (e.g., a satellite signal) is low. Accordingly, the disclosed systems may need to have more frequent location updates.

At block 432, the method may include determining a location reporting timing (e.g., a frequency of reporting a vehicle's location). In one embodiment, the frequency of location reporting can be based on the confidence level determined at block 430. Further, the location reporting timing may be due to power constraints of the antenna system. For example, if the antenna system is being powered by a backup battery source having less power than usual, the frequency of location reporting may be lower in comparison with when the antenna system is being powered by the main power supply of the vehicle.

Figure 5:
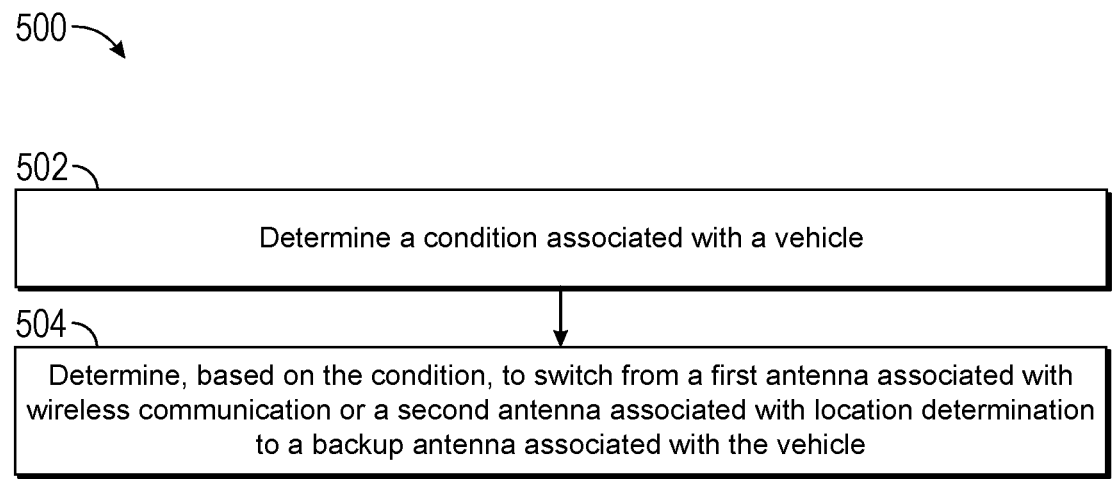
FIG. 5 is an illustration of another exemplary method for using the antenna system, in accordance with example embodiments of the disclosure.

FIG. 5 is an illustration of another exemplary method for using the antenna system, in accordance with example embodiments of the disclosure. At block 502, the method may include determining a condition associated with a vehicle. At block 504, the method may include determining, based on the condition, to switch from an antenna associated with wireless communication or a location determination antenna to a backup antenna associated with the vehicle. Further, the backup antenna may have a wireless communication capability and location determination capability.

Figure 6:
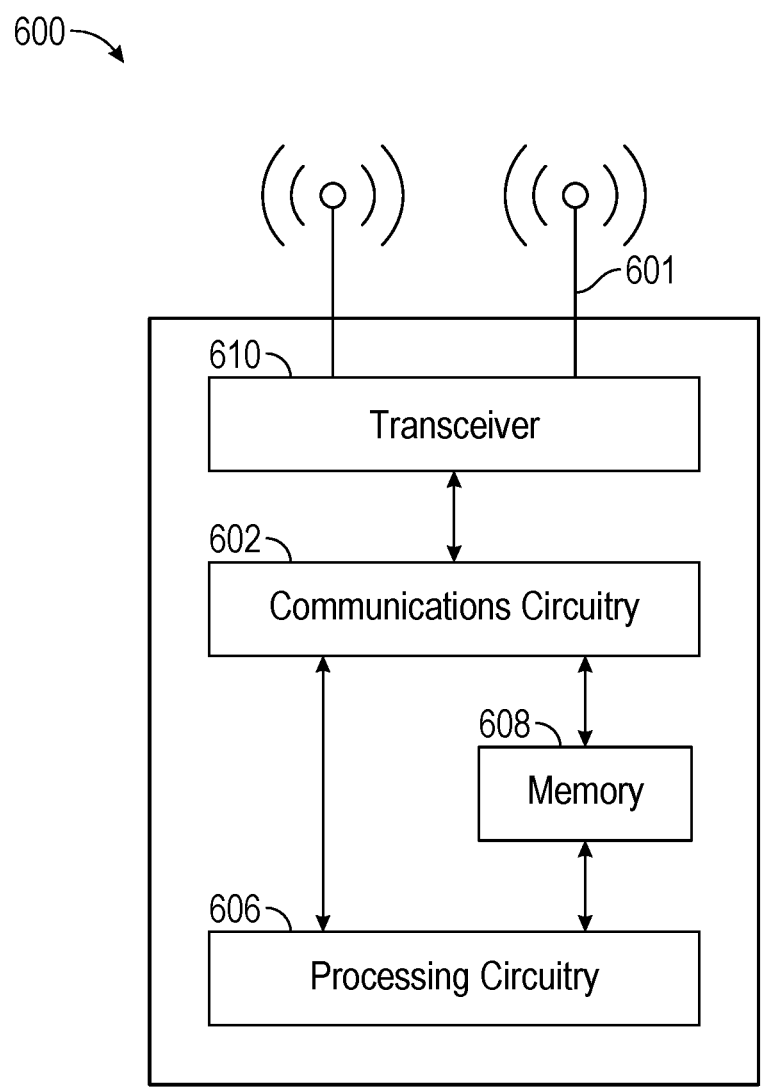
FIG. 6 shows a functional diagram of an exemplary communication station in accordance with some embodiments.

FIG. 6 shows a functional diagram of an exemplary communication station 600 in accordance with some embodiments. In particular, the communication station 600 may be part of the disclosed antenna system, and may be used in the transmission and reception of data over a network. In one embodiment, FIG. 6 illustrates a functional block diagram of a communication station that may be suitable for use as an AP 302 (FIG. 3) or communication station user device 320 (FIG. 3) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601 (e.g., similar, but not necessarily identical to, the antennas shown and described in connection with FIG. 2, above). The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5, above.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. As previously noted, the antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
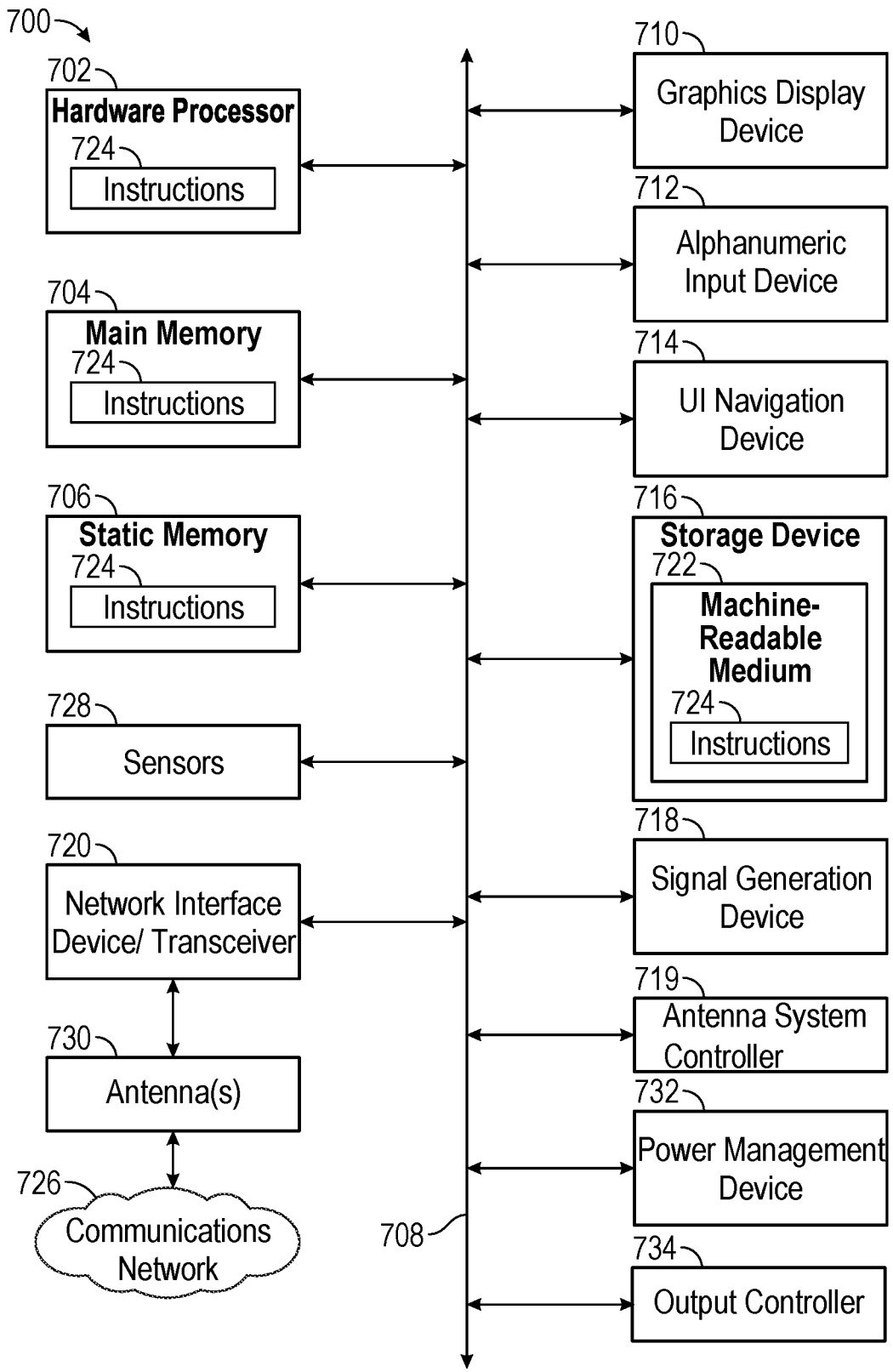
FIG. 7 illustrates a block diagram of an example of a machine or system upon which any one or more of the techniques discussed herein may be performed, in accordance with example embodiments of the disclosure.

FIG. 7 illustrates a block diagram of an example of a machine 700 or system upon which any one or more of the techniques (e.g., methodologies) discussed herein may be performed. For example, the machine 700 may be used in connection with the antenna system to perform any of the techniques described herein. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time The machine (e.g., computer system) 700 may include a hardware processor 702 (e.g., a central processing unit (CPU), a graphics processing unit (GPU), a hardware processor core, or any combination thereof), a main memory 1004 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an antenna system controller 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.))

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media The antenna system controller 719 may be configured to determine a condition associated with a vehicle and determine, based on the condition, to switch from an antenna associated with wireless communication or a location determination antenna to a backup antenna associated with the vehicle. Further, the backup antenna may have a wireless communication capability and a location determination capability. The antenna system controller 719 may be further configured to determine that the antenna and the location determination antenna fail a diagnostic test, determine to perform a location determination of the vehicle, cause to switch from the antenna and the location determination antenna to the backup antenna to collect location data using the location determination capability, and determine to send the location data using the antenna. In another embodiment, the antenna system controller 719 may be configured to determine a confidence level associated with the location determination based on vehicle conditions, wherein the vehicle conditions include at least one of a mode status of the vehicle, a power status of the vehicle, a motion status of the vehicle, or a signal strength associated with the backup antenna.

It is understood that the above are only a subset of what the antenna system controller 719 may be configured to perform and that other functions included throughout this disclosure may also be performed by the antenna system controller 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), cellular (e.g., LTE) networks, location-determination networks (e.g., GPS and/or GNSS networks) Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
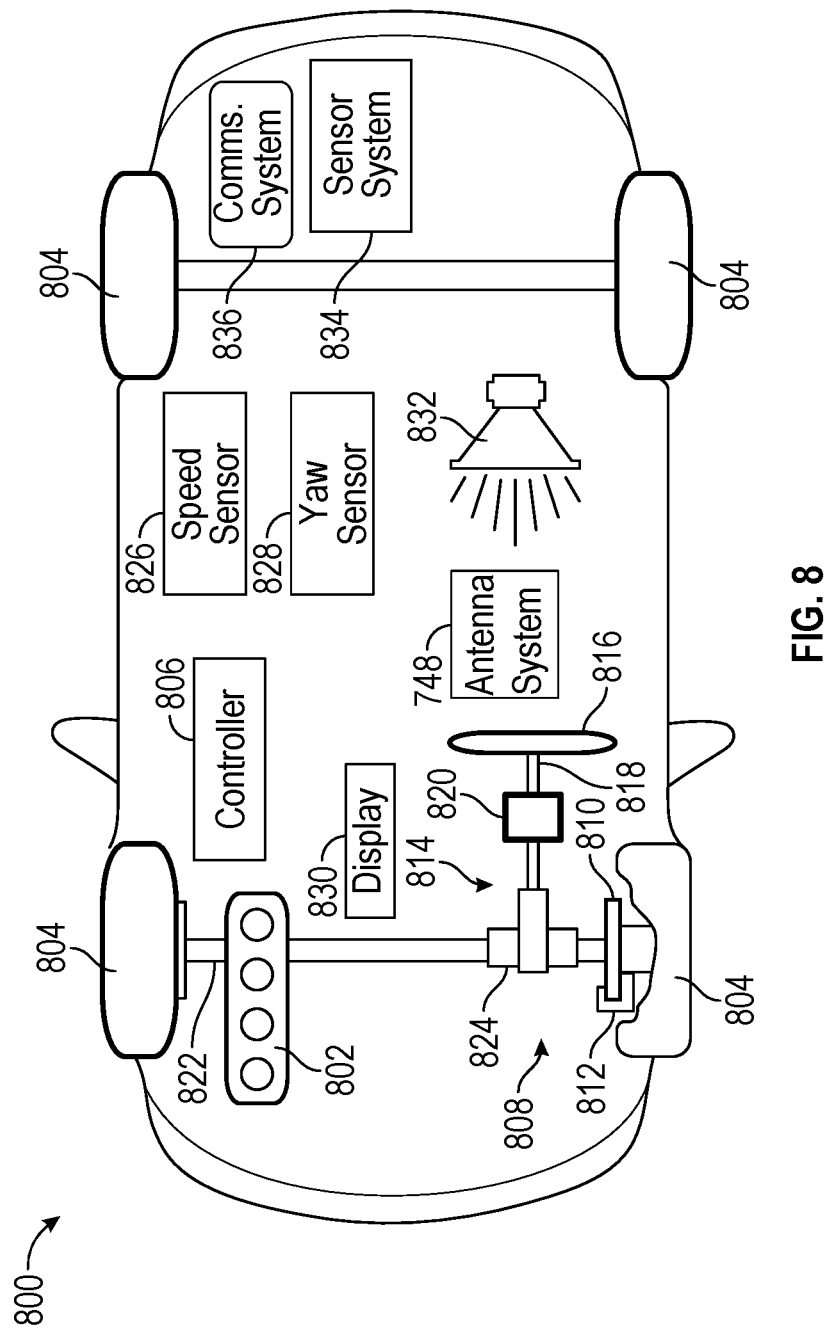
FIG. 8 is a schematic illustration of an example autonomous vehicle, in accordance with one or more embodiments of the disclosure.

FIG. 8 is a schematic illustration of an example autonomous vehicle in accordance with one or more embodiments of the disclosure. In particular, the antenna system and associated techniques described herein may be performed on any suitable vehicle including autonomous vehicles. In further examples, the antenna system may facilitate the interaction of an autonomous vehicle with its environment (e.g., a smart-city infrastructure, radio and Internet broadcasts, etc.). Referring to FIG. 8, an example autonomous vehicle 800 (which may correspond to the vehicle 102 of FIG. 1) may include a powerplant 802 (such as a combustion engine and/or an electric motor) that provides torque to drive wheels 804 that propel the vehicle forward or backward. Autonomous vehicle operation, including propulsion, steering, braking, navigation, and the like, may be controlled autonomously by a vehicle controller 806. For example, the vehicle controller 806 may be configured to receive feedback from one or more sensors (e.g., sensor system 834, etc.) and other vehicle components to determine road conditions, vehicle positioning, and so forth. The vehicle controller 806 may also ingest data from the speed monitor and yaw sensor, as well as the tires, brakes, motor, and other vehicle components. The vehicle controller 806 may use the feedback and the route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth.

The vehicle controller 806 may include one or more computer processors coupled to at least one memory. The vehicle 800 may include a braking system 808 having disks 810 and calipers 812. The vehicle 800 may include a steering system 814. The steering system 814 may include a steering wheel 816, a steering shaft 818 interconnecting the steering wheel to a steering rack 820 (or steering box). The front and/or rear wheels 804 may be connected to the steering rack 820 via an axle 822. A steering sensor 824 may be disposed/located proximate to the steering shaft 818 to measure a steering angle. The vehicle 800 also includes a speed sensor 826 that may be disposed at the wheels 804 or in the transmission. The speed sensor 826 is configured to output a signal to the controller 806 indicating the speed of the vehicle. A yaw sensor 828 is in communication with the controller 806 and is configured to output a signal indicating the yaw of the vehicle 800.

In some embodiments, the vehicle 808 may include an antenna system 848 that is similar to the antenna systems shown and described in connection with FIGS. 1-7, above.

The vehicle 800 includes a cabin having a display 830 in electronic communication with the controller 806. The display 830 may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system 832 may be disposed within the cabin and may include one or more speakers for providing information and entertainment to the driver and/or passengers. The audio system 832 may also include a microphone for receiving voice inputs. The vehicle may include a communications system 836 that is configured to send and/or receive wireless communications via one or more networks. The communications system 836 may be configured for communication with devices in the car or outside the car, such as a user's device, other vehicles, etc.

The vehicle 800 may also include a sensor system for sensing areas external to the vehicle. The vision system may include a plurality of different types of sensors and devices such as cameras, ultrasonic sensors, RADAR, LIDAR, and/or combinations thereof. The vision system may be in electronic communication with the controller 806 for controlling the functions of various components. The controller may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "lookup tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers and/or computer processors. The controller 806 may receive signals from the sensor system 834 and may include memory containing machine-readable instructions for processing the data from the vision system. The controller 806 may be programmed to output instructions to at least the display 830, the audio system 832, the steering system 814, the braking system 808, and/or the powerplant 802 to autonomously operate the vehicle 800.

Figure 9:
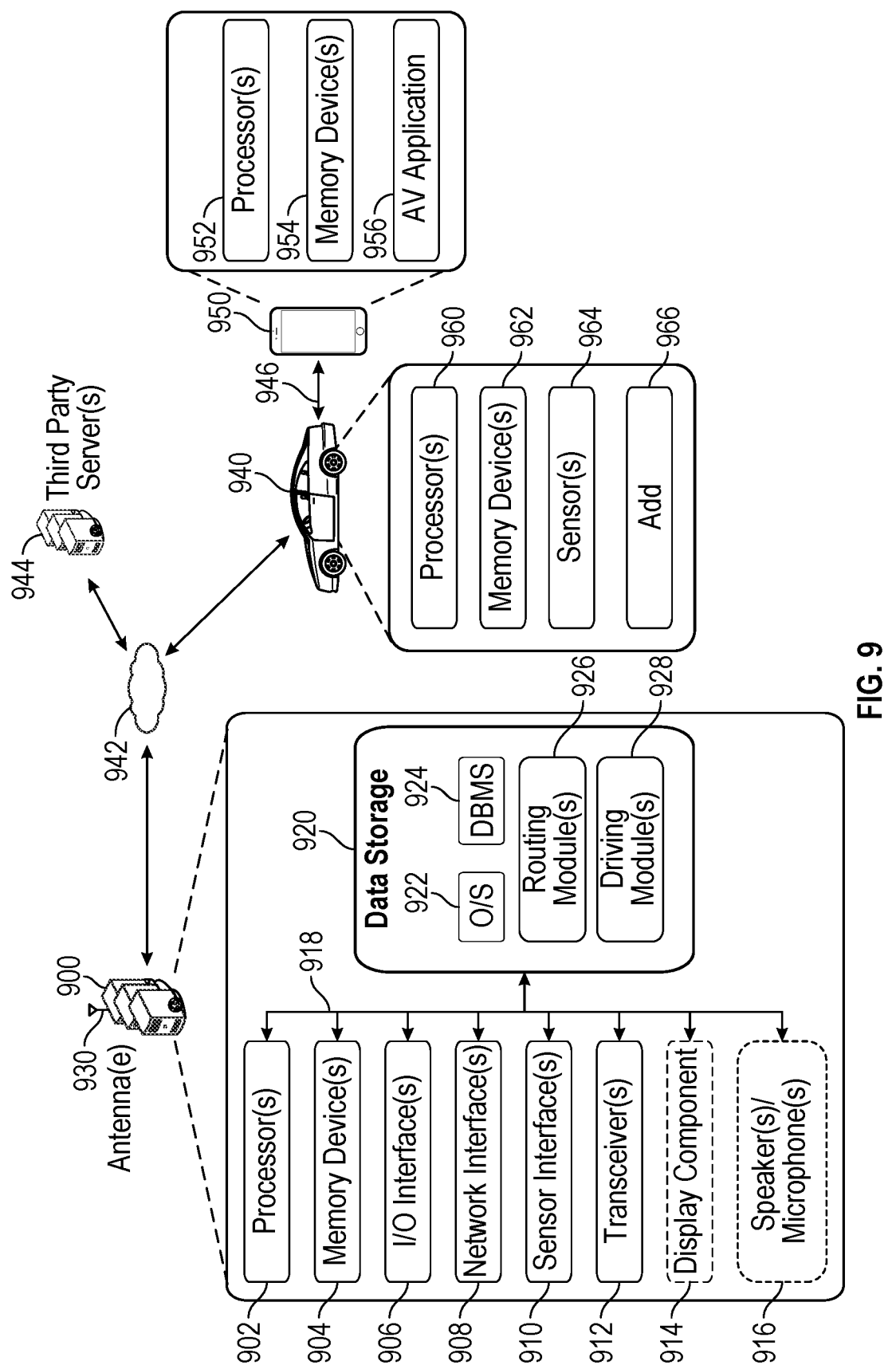
FIG. 9 is a schematic illustration of an example server architecture for one or more server(s), in accordance with one or more embodiments of the disclosure.

FIG. 9 is a schematic illustration of an example server architecture for one or more server(s) 900 in accordance with one or more embodiments of the disclosure. The server 900 illustrated in the example of FIG. 9 may correspond to a computer system configured to implement the functionality discussed with respect to FIGS. 1-8. In particular, the server 900 may be used to configure and/or transmit and receive information from the disclosed antenna system, as further described below. Some or all of the individual components may be optional and/or different in various embodiments. In some embodiments, the server 900 illustrated in FIG. 9 may be located at a vehicle 940. For example, some or all or the hardware and functionality of the server 900 may be provided by the vehicle 940. The server 900 may be in communication with the vehicle 940, as well as one or more third-party servers 944 (e.g., servers that store vehicle condition data, user device data, antenna system data, etc.), and one or more user devices 950. The vehicle 940 may be in communication with the user device 950.

The server 900, the third-party server 944, the vehicle 940, and/or the user device 950 may be configured to communicate via one or more networks 942. The vehicle 940 may additionally be in wireless communication 946 with the user device 950 via a connection protocol such as Bluetooth or Near Field Communication. The server 900 may be configured to communicate via one or more networks 942. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver(s) 912, one or more optional display components 914, one or more optional camera(s)/speaker(s)/microphone(s) 916, and data storage 920. The server 900 may further include one or more bus(es) 918 that functionally couple various components of the server 900. The server 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a GNSS antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the server 900. The bus(es) 918 may include, without limitation, a memory bus or a memory controller, a peripheral bus, an accelerated graphics port, and so forth. The bus(es) 918 may be associated with any suitable bus architecture.

The memory 904 of the server 900 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 920 may include removable storage and/or non-removable storage including, but not limited to, magnetic storage, optical disk storage, and/or tape storage. The data storage 920 may provide non-volatile storage of computer-executable instructions and other data.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. More specifically, the data storage 920 may store one or more operating systems (O/S) 922; one or more database management systems (DBMSs) 924; and one or more program module(s), applications, engines, computer-executable code, scripts, or the like such as, for example, one or more routing module(s) 926 and/or one or more driving module(s) 928. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The processor(s) 902 may be configured to access the memory 904 and execute the computer-executable instructions loaded therein. For example, the processor(s) 902 may be configured to execute the computer-executable instructions of the various program module(s), applications, engines, or the like of the server 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit.

Referring now to functionality supported by the various program module(s) depicted in FIG. 9, the routing module(s) 926 may include computer-executable instructions, code, or the like that responsive to execution by one or more of the processor(s) 902 may perform one or more blocks of the process flows herein and/or functions including, but not limited to, determining vehicle conditions described herein based on data from vehicle devices and/or sensors, determining vehicle locations, determining antenna switching behavior, and/or the like.

The routing module 926 may be in communication with the vehicle 940, the third-party server 944, the user device 950, and/or other components. For example, the routing module may send route data to the vehicle 940, receive data from the third-party server 944, receive user selections from the user device 950, and so forth.

The driving module(s) 928 may include computer-executable instructions, code, or the like that responsive to execution by one or more of the processor(s) 902 may perform functions including, but not limited to, sending and/or receiving data, determining a vehicle condition, and the like. In some embodiments, the driving module 928 may be partially or wholly integral to the vehicle 940.

The driving module 928 may be in communication with the vehicle 940, the third-party server 944, the user device 950, and/or other components. For example, the driving module may send traffic information to the vehicle 940, receive location data from the third-party server 944, receive user inputs (e.g., login information for a wireless connection) from user device 950, and so forth.

Referring now to other illustrative components depicted as being stored in the data storage 920, the O/S 922 may be loaded from the data storage 920 into the memory 904 and may provide an interface between other application software executing on the server 900 and the hardware resources of the server 900.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. As noted, in various embodiments, databases may store information associated with antenna systems and/or vehicle conditions.

Referring now to other illustrative components of the server 900, the input/output (I/O) interface(s) 906 may facilitate the receipt of input information by the server 900 from one or more I/O devices as well as the output of information from the server 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 900 may further include one or more network interface(s) 908 via which the server 900 may communicate with any of a variety of other systems, platforms, networks, devices, and so forth. The network interface(s) 908 may enable communication, for example, with one or more wireless routers, one or more host servers, one or more web servers, and the like via one or more networks.

The sensor(s)/sensor interface(s) 910 may include or may be capable of interfacing with any suitable type of sensing device such as, for example, inertial sensors, force sensors, thermal sensors, photocells, and so forth.

The display component(s) 914 may include one or more display layers, such as LED or LCD layers, touchscreen layers, protective layers, and/or other layers. The optional camera(s) 916 may be any device configured to capture ambient light or images. The optional microphone(s) 916 may be any device configured to receive analog sound input or voice data. The microphone(s) 916 may include microphones used to capture sound.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module.

It should further be appreciated that the server 900 may include alternate and/or additional hardware, software, or firmware components beyond those described or depicted without departing from the scope of the disclosure.

The user device 950 may include one or more computer processor(s) 952, one or more memory devices 954, and one or more applications, such as a vehicle application 956. Other embodiments may include different components.

The processor(s) 952 may be configured to access the memory 954 and execute the computer-executable instructions loaded therein. For example, the processor(s) 952 may be configured to execute the computer-executable instructions of the various program module(s), applications, engines, or the like of the device to cause or facilitate various operations to be performed in accordance with one or more embodiments of the disclosure. The processor(s) 952 may include any suitable processing unit capable of accepting data as input, processing the input data in accordance with stored computer-executable instructions, and generating output data. The processor(s) 952 may include any type of suitable processing unit.

The memory 954 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 950, the vehicle application 956 may be a mobile application executable by the processor 952 that can be used to present options and/or receive user inputs of information related to network status, external connections, user device status and/or the like.

The vehicle 940 may include one or more computer processor(s) 960, one or more memory devices 962, one or more sensors 964, and one or more applications, such as an autonomous driving application 966. Other embodiments may include different components. A combination or sub-combination of these components may be integral to the processing circuitry 606 in FIG. 6.

The processor(s) 960 may be configured to access the memory 962 and execute the computer-executable instructions loaded therein. For example, the processor(s) 960 may be configured to execute the computer-executable instructions of the various program module(s), applications, engines, or the like of the device to cause or facilitate various operations to be performed in accordance with one or more embodiments of the disclosure. The processor(s) 960 may include any suitable processing unit capable of accepting data as input, processing the input data in accordance with stored computer-executable instructions, and generating output data. The processor(s) 960 may include any type of suitable processing unit.

The memory 962 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the vehicle 940, the autonomous driving application 966 may be a mobile application executable by the processor 960 that can be used to receive data from the sensors 964, and/or control operation of the vehicle 940.

One or more operations of the methods, process flows, and use cases of FIGS. 1-9 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Example 1 may include a device, the device including: at least one memory device that stores computer-executable instructions; and at least one processor configured to access the at least one memory device, wherein the at least one processor is configured to execute the computer-executable instructions to: determine a condition associated with a vehicle; and determine, based on the condition, to switch from a first antenna associated with wireless communication, or a second antenna associated with location determination, to a backup antenna associated with the vehicle, wherein the backup antenna has a wireless communication capability and a location determination capability.

Example 2 may include the device of example 1 and may further include computer-executable instructions to: determine that the first antenna and the second antenna fail a diagnostic test; determine to perform a location determination of the vehicle; cause to switch from the first antenna and the second antenna to the backup antenna to collect location data using the location determination capability; and determine to send the location data using the backup antenna.

Example 3 may include the device of example 2 and may further include computer-executable instructions to: determine a confidence level associated with the location determination based on vehicle conditions, wherein the vehicle conditions include at least one of a mode status of the vehicle, a power status of the vehicle, a motion status of the vehicle, or a signal strength associated with any one of the first antenna, the second antenna, or backup antenna.

Example 4 may include the device of example 2 and may further include computer-executable instructions to adjust a frequency of location determination based on the confidence level.

Example 5 may include the device of example 1 where the first antenna includes a cellular antenna and the second antenna comprises a global navigation satellite system (GNSS) antenna.

Example 6 may include the device of example 1 where at least one of the first antenna or the second antenna is positioned at least partially on an exterior location of the vehicle.

Example 7 may include the device of example 1 where the backup antenna is positioned in an interior location of the vehicle.

Example 8 may include the device of example 1 where the condition is based on a status of at least one of the first antenna, the second antenna, or the backup antenna.

Example 9 may include the device of example 1 where the condition is based on a duration to complete a data transmission using the first antenna, the second antenna, or the backup antenna.

Example 10 may include the device of example 1 where the condition is based on reporting requirements associated with a data transmission by the first antenna, the second antenna, or the backup antenna.

Example 11 may include the device of example 1 where the condition is based on a status associated with a power source associated with the first antenna, the second antenna, or the backup antenna.

Example 12 may include the device of example 1 where the computer-executable instructions to determine to switch comprises causing a switching network to switch from the first antenna and the second antenna to the backup antenna.

Example 13 may include a system, including: at least one memory device that stores computer-executable instructions; and at least one processor configured to access the at least one memory device, wherein the at least one processor is configured to execute the computer-executable instructions to: determine a condition associated with a vehicle; and determine, based on the condition, to switch from a first antenna associated with wireless communication, or a second antenna associated with location determination, to a backup antenna associated with the vehicle, wherein the backup antenna has a wireless communication capability and location determination capability.

Example 14 may include the system of example 13 further including computer-executable instructions to: determine that the first antenna and the second antenna fail a diagnostic test; determine to perform a location determination of the vehicle; cause to switch from the first antenna and the second antenna to the backup antenna to collect location data using the location determination capability; and determine to send the location data using the backup antenna.

Example 15 may include the system of example 13 further including computer-executable instructions to: determine a confidence level associated with the location determination based on vehicle conditions, wherein the vehicle conditions include at least one of a mode status of the vehicle, a power status of the vehicle, a motion status of the vehicle, or a signal strength associated with any one of the first antenna, the second antenna, or the backup antenna.

Example 16 may include the system of example 13 further including computer-executable instructions to adjust a frequency of location determination based on the confidence level.

Example 17 may include the system of example 13 where the first antenna comprises a cellular antenna and the second antenna comprises a GNSS antenna.

Example 18 may include the system of example 13 where at least one of the first antenna or the second antenna is positioned at least partially on an exterior of the vehicle, and wherein the backup antenna is positioned in an interior of the vehicle.

Example 19 may include a method including: determining a condition associated with a vehicle; and determining, based on the condition, to switch from a first antenna associated with wireless communication, or a second antenna associated with location determination, to a backup antenna associated with the vehicle, wherein the backup antenna has a wireless communication capability and location determination capability.

Example 20 may include the method of example 19 further including: determining that the first antenna and the second antenna fail a diagnostic test; determining to perform a location determination of the vehicle; switching from the first antenna and the second antenna to the backup antenna to collect location data using the location determination capability; and determining to send the location data using the backup antenna.

What is claimed is:

1. A device, comprising:
    at least one memory device that stores computer-executable instructions; and
    at least one processor configured to access the at least one memory device, wherein the at least one processor is configured to execute the computer-executable instructions to:
        determine a condition associated with a vehicle, wherein the vehicle comprises at least three antennas, wherein the condition is associated with a failure on a first antenna capable of performing cellular communication or a failure on a second antenna capable of determining a global navigation satellite system (GNSS) location of the vehicle; and
        determine to switch from the first antenna or the second antenna to a backup antenna associated with the vehicle, based on the condition and based on the level of confidence of the location of the vehicle using the second antenna,
        wherein the backup antenna has a switch capable of switching between a first path associated with cellular communication capability and a second path associated with a location determination capability.

2. The device of claim 1, further comprising computer-executable instructions to:
    determine that the first antenna and the second antenna fail a diagnostic test;
    determine to perform a location determination of the vehicle;
    cause to switch from the first antenna and the second antenna to the backup antenna to collect location data using the location determination capability; and
    determine to send the location data using the backup antenna.

3. The device of claim 2, further comprising computer-executable instructions to:
    determine a confidence level associated with the location determination based on vehicle conditions, wherein the vehicle conditions include at least one of a mode status of the vehicle, a power status of the vehicle, a motion status of the vehicle, or a signal strength associated with any one of the first antenna, the second antenna, or backup antenna.

4. The device of claim 2, further comprising computer-executable instructions to adjust a frequency of location determination based on the confidence level.

5. The device of claim 1, wherein at least one of the first antenna or the second antenna is positioned at least partially on an exterior location of the vehicle.

6. The device of claim 1, wherein the backup antenna is positioned in an interior location of the vehicle.

7. The device of claim 1, wherein the condition is based on a status of at least one of the first antenna, the second antenna, or the backup antenna.

8. The device of claim 1, wherein the condition is based on a duration to complete a data transmission using the first antenna, the second antenna, or the backup antenna.

9. The device of claim 1, wherein the condition is based on reporting requirements associated with a data transmission by the first antenna, the second antenna, or the backup antenna.

10. The device of claim 1, wherein the condition is based on a status associated with a power source associated with the first antenna, the second antenna, or the backup antenna.

11. The device of claim 1, wherein the computer-executable instructions to determine to switch comprises causing the switching network to switch from the first antenna and the second antenna to the backup antenna.

12. A system, comprising:
at least one memory device that stores computer-executable instructions; and
at least one processor configured to access the at least one memory device, wherein the at least one processor is configured to execute the computer-executable instructions to:
determine a condition associated with a vehicle, wherein the vehicle comprises at least three antennas, wherein the condition is associated with a failure on a first antenna capable of performing cellular communication or a failure on a second antenna capable of determining a global navigation satellite system (GNSS) location of the vehicle; and
determine to switch from the first antenna or the second antenna to a backup antenna associated with the vehicle, based on the condition and based on the level of confidence of the location of the vehicle using the second antenna,
wherein the backup antenna has a switch capable of switching between a first path associated with cellular communication capability and second path associated with a location determination capability.

13. The system of claim 12, further comprising computer-executable instructions to:
determine that the first antenna and the second antenna fail a diagnostic test;
determine to perform a location determination of the vehicle;
cause to switch from the first antenna and the second antenna to the backup antenna to collect location data using the location determination capability; and
determine to send the location data using the backup antenna.

14. The system of claim 12, further comprising computer-executable instructions to:
determine a confidence level associated with the location determination based on vehicle conditions, wherein the vehicle conditions include at least one of a mode status of the vehicle, a power status of the vehicle, a motion status of the vehicle, or a signal strength associated with any one of the first antenna, the second antenna, or the backup antenna.

15. The system of claim 14, further comprising computer-executable instructions to adjust a frequency of location determination based on the confidence level.

16. The system of claim 12, wherein at least one of the first antenna or the second antenna is positioned at least partially on an exterior of the vehicle, and wherein the backup antenna is positioned in an interior of the vehicle.

17. A method comprising:
determining a condition associated with a vehicle, wherein the vehicle comprises at least three antennas, wherein the condition is associated with a failure on a first antenna capable of performing cellular communication or a failure on a second antenna capable of determining a global navigation satellite system (GNSS) location of the vehicle; and
determining to switch from the first antenna or the second antenna to a backup antenna associated with the vehicle, based on the condition and based on the level of confidence of the location of the vehicle using the second antenna,
wherein the backup antenna has a switch capable of switching between a first path associated with cellular communication capability and a second path associated with a location determination capability.

18. The method of claim 17, further comprising:
determining that the first antenna and the second antenna fail a diagnostic test;
determining to perform a location determination of the vehicle;
switching from the first antenna and the second antenna to the backup antenna to collect location data using the location determination capability; and
determining to send the location data using the backup antenna.

* * * * *